Jan. 6, 1970              E. S. TAMM              3,488,572
                     MOTOR SIGNALING CIRCUIT
                      Filed Oct. 22, 1965

INVENTOR:
EMIL S. TAMM
BY John H. Sutherland
ATTORNEY.

ated Jan. 6, 1970

3,488,572
MOTOR SIGNALING CIRCUIT
Emil S. Tamm, Fort Smith, Ark., assignor to Baldor Electric Company, Fort Smith, Ark., a corporation of Missouri
Filed Oct. 22, 1965, Ser. No. 500,594
Int. Cl. H02p 7/00
U.S. Cl. 318—490                    3 Claims

ABSTRACT OF THE DISCLOSURE

Signaling system for indicating overload in an electric motor without interrupting the operation of the motor.

---

Figure 1:
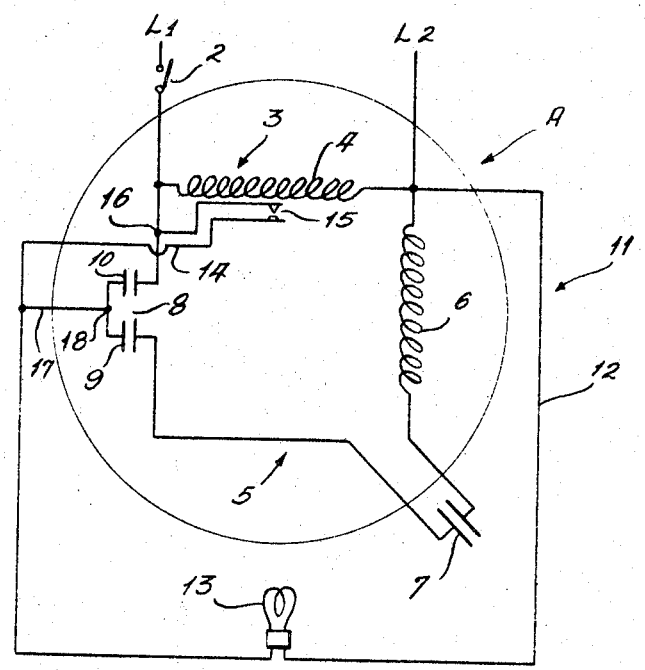

This invention relates in general to electrical motors, and more particularly, pertains to an electrical motor signaling circuit that may be incorporated within the circuitry of an electrical motor.

It is an object of this invention to provide an electrical motor signaling circuit which is included within the circuitry of an electrical motor for providing a forewarning to the user of the electrical motor that it is being overloaded in its use to such an extent that its internal temperature has increased to a dangerously overheated level, or that its motor torque is being restrained in supplying working power.

Prior inventions within the field of electrical motor controls have provided various forms of motor regulating devices which primarily function to furnish protection to overworked motors by curtailing the source of electrical power which thereby ends the operation of the motor. One such common device includes the use of a switch which is responsive to the elevated temperatures emanating from the overheating of the motor's primary or auxiliary circuits, or from similar high temperatures frictionally produced by the motivated portions of the motor structure. Such thermally responsive switches ordinarily are connected to the power supply lines of the electrical motor so that when said switches are broken in contact, they eliminate a further conduction of charge into the electrical motor and thereby discontinue its further operation. Also, other switches are responsive to the operation of the centrifugal switch which is normally incorporated within the electrical circuitry of a capacitor start motor, so that as the operational power torque created by the energized motor is lessened to such an extent that said centrifugal switch re-engages into contact, such functions to actuate an additional switch for shutting off the power source of the electrical motor and end for its further operation. The main problem presented by the use of the aforementioned type electrical motor controls is that they function upon the overloading of the motor to totally exclude any further conduction of current from the power source which supplies electrical charge for the operation of the motor. It is often undesirable to provide such extreme measure of control for a slightly overworked electrical motor, such as when the motor is incorporated into the various types of hand power tools or other small electrical machinery which receives its motor torque from a capacitor start motor. Especially is such control a nuisance as when the operator of the aforementioned instruments would be nearing completion of a work project only to have the tool of machinery cease operation because of a slight overload or overheating of the motor. Such an action is a source of annoyance to the party making use of the motor since he must await and be delayed in the final performance of his work until the internal temperature of the motor has decreased to such an extent that the thermally responsive switch engages and returns the motor circuitry into electrical contact. Other prior inventions reveal the use of structural levers or pivot arms which coact in conjunction with the various mechanically movable parts of the electrical motor to provide a warning as to when the electrical motor, or the tool and machinery in which it is incorporated, is being overloaded. Such devices, as previously stated, function to operate under the movement of various mechanical levers which are subject to enhanced deterioration, and only partially incorporate in their operation electrically operated signaling means.

Therefore, it is another object of this invention to provide a motor signaling circuit, which will act in conjunction when electrically connected with a thermally responsive switch or centrifugal switch to provide a warning to the user of the motor that its safe working load is being exceeded.

It is a further object of this invention to provide a motor signaling circuit which may be incorporated within an electrical motor as used in various power tools or machinery and which will function to provide a warning to the user of the aforementioned type apparatuses that they are being overtaxed in their use, but yet, the integral circuit will not prevent a further functioning of the motor thereby allowing the operator at his discretion to uninterruptedly continue his work or to slightly reduce the work load upon the motor.

Still another object of this invention is to provide an electrical motor signaling circuit which may be included within the circuitry of a common capacitor start or capacitor run motor and therein function to disclose a cautionary warning as when the motor is being overloaded in its use so that the operator acting under his volition may decrease the work load and prevent the destruction of the motor's various parts, such as the charge regulating capacitors which normally deteriorate when subjected to elevated temperatures or excessive loads.

Yet another object of this invention is to provide an electrical motor signaling circuit which responds to a malfunctioning of its integral motor and is selectively initially excited by various sensitive devices which are responsive to the overloading of the workable parts of said motor.

An additional object of this invention is to provide an electrical motor signaling circuit which may be easily interconnected within the ordinary circuitry of the electrical motor without necessitating the addition of any bulky components or impairing the uniform and streamlined outward appearance of the motor's structure.

Figure 2:
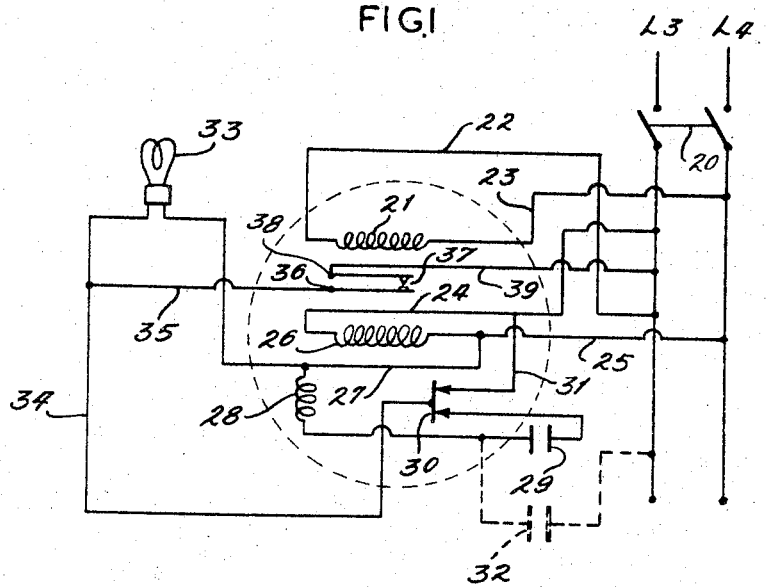

Additional objects and details of this invention will become readily apparent from the following description when read in conjunction with the accompanying drawings (one sheet) wherein:

FIGURE 1 is a schematic circuit diagram of a capacitor start motor incorporating the electrical signaling circuit of this invention; and FIGURE 2 is a circuit diagram of a capacitor motor including the signaling circuit of this invention.

Referring now in detail to the drawings, in FIGURE 1 is shown a circuit diagram of a capacitor motor A, which is energized for operation by the electric charge conducted to said motor by means of circuit lines $L_1$ and $L_2$. The control of the electric charge as conveyed to said motor for providing a means for its operation may be regulated by the user by manipulating the switch 2 into closed circuit, line contact for conducting current, or open into a circuit breaking nonconducting position. Circuit lines $L_1$ and $L_2$ are further connected to the primary windings circuit 3 of the motor stator assembly and therein energize the run windings 4 which provides a continuous motor torque for sustained operation of the motor as when it is maintained "on" and in working condition. Further connected for receiving electrical power from the circuit lines is an auxiliary windings circuit 5 which contains in series start windings 6 and a common starting capacitor 7, which may be of the common electrolytic type or any other type capacitor which is normally utilized within a capacitor motor. These aforementioned start windings and associated capacitor normally function during the initial stage of operation of the motor to assist in its torque build up as when the motor is first turned on, and will continue to provide an additional electromotive power until the motor has attained a predetermined efficiency of operation at which time a centrifugal switch 8 connected in series within the auxiliary windings circuit functions under centrifugal force to break contact and thereby render the auxiliary windings circuit open and nonconductive of current, as during the sustained continuous operation of the electrical motor. The centrifugal switch 8 preferably is of a dual pole construction containing two sets of contact members 9 and 10, which are series connected. Attached within the circuitry of the electrical motor and disposed in parallel relationship to the primary and auxiliary windings circuits is a signaling circuit 11 comprising a conductor 12 attached to an indicator 13 which may be a common bell, or as revealed, an incandescent lamp. Conductor 12 also connects to a terminal 14 of a thermally responsive switch 15, which may be of the bi-metallic or thermostatic type switch, and which is responsive to variations in the vicinal temperature within the motor. The other terminal 16 of said thermally responsive switch is connected to the circuit line $L_1$ or a conductor attached to said line. It should be noted that this thermally responsive switch is embedded in or is disposed in contiguous relationship to the run windings 4 of the electrical motor, and is therein sensitive to and regulated by the fluctuations in temperatures normally developed by the constant operation and occasional overloading of the run windings as during sustained or excessive use of the electrical motor.

Attached to the conductor 12 is an electrical conductor 17 which attaches at one end, as at 18, to the centrifugal switch its dual contact members 9 and 10. By interconnecting the signaling circuit 11 by means of the conductor 17 to the centrifugal switch of the auxiliary windings circuit of the motor, the indicator 13 will also be responsive to variations in motor speed. For example, should a motor operating under normal running conditions and furnishing a sustained motor torque be subjected to an abnormal overload, the motor speed will consequently be reduced possibly to the level at which the centrifugal switch will reengage into contact and thereby effect an energizing of the indicator and provide a warning to the operator.

Disclosed in FIGURE 2 is a circuit diagram of a capacitor start, capacitor run type motor and which further reveals the electrical signaling circuit of this invention. Energy is supplied to the electrical motor through the circuit lines $L_3$ and $L_4$, and a double pole electric switch 20 provides a means for the user to start or stop the operation of said motor. Motor torque is developed within the electrical motor by means of the electromotive force created by the run windings 21 of the primary windings circuit connected across the circuit lines $L_3$ and $L_4$ by means of conductors 22 and 23. Also provided within the primary windings circuit and electrically connected to circuit lines $L_3$ and $L_4$ by means of current conductors 24 and 25 is an additional series of run windings 26 that are contained in said primary winding circuit to furnish additional motor power and are connected in parallel to the aforementioned run windings 21. This use of a dual form of parallel run windings provides for a more constant inducement of electromotive force that coacts in conjunction with the motor rotor to produce a steady and efficient motor torque and power for continuous operation of the motor. Connected to the conductor 25 is another electrical conductor 27 which is further attached thereto with the windings 28 of the auxiliary windings circuit of the motor. Provided in series with the aforementioned windings is a starting capacitor 29 which provides for a slight shift in phase of the electrical charge conveyed through the windings 28 during the power build up of the motor as when it is first turned to the "on" position. Also provided in series within the auxiliary windings circuit is a common double pole centrifugal switch 30 which is connected by means of a conductor 31 to one of the main conductors 24 of the primary windings circuit. Optionally provided is a run capacitor 32 that is disclosed within the auxiliary windings circuit and may be connected directly to the circuit line $L_3$, by-passing the centrifugal switch 30 for thereby maintaining the windings 28 in continuous operation within the circuitry of the electrical motor during its sustained operation as when in use.

Conductor 27 is further extended and attaches to one terminal of an indicator, such as a lamp 33, the other terminal of said indicator being connected to a conductor 34 which further attaches to the centrifugal switch 30 intermediate its dual contact members. Attaching to the conductor 34 is another electrical conductor 35 which connects to one terminal 36 of a thermally responsive switch 37, the other terminal 38 of said switch being connected to a conductor 39 which joins to the circuit line $L_3$ of this invention.

In operation, the signaling circuit of this invention provides a means for communicating to the user of the power too or mechanical device in which the invention is incorporated a forewarning that the motor is being overloaded in its use. With the signaling circuit alerting the user of a mulfunctioning in the performance of the electrical motor, the user is stimulated as a precaution to decrease the operational load upon the motor so that it may be utilized within a range of safety. The motor circuitry, as revealed in FIGURE 1, is usually energized by means of ordinary single phase alternating current which is conducted to the electrical motor by means of circuit lines $L_1$ and $L_2$. When switch 2 is moved into closed, current conducting contact within the circuit lines, electrical charge will be supplied to the motor wherein it will energize the run windings 4 of the primary windings circuit and the start windings 6 of the auxiliary windings circuit. Since the capacitor 7 contained within the auxiliary winding circuit functions to shift the electrical charge conveyed therethrough out-of-phase with the current conducted through the primary windings circuit, a dual form of electromotive force will be created by these two circuits to assist in initially building up the motor torque and to maintain the motor at a sustained running speed. During the initial energization of the electrical motor, the contacts of the centrifugal switch 8 will be in engagement and thereby provide a closed circuit path for the flow of current through the signaling circuit 11 and therein will light the incandescent lamp 13. Since the motor will only have just recently been turned to the "on" position, the flashing of the indicator should not dismay the operator since the motor should not as yet have been overloaded. As the motor power builds up and reaches a predetermined efficiency, the centrifugal force exerted upon switch 8 will force it to break contact and thereby eliminate any further excitation of the auxiliary windings circuit within the motor circuitry, and also will curtail any further transfer of electric charge through the signaling circuit 11 causing the incandescent lamp to be extinguished. At this stage in the performance of the motor, it will have attained a maximum efficiency of performance so that the power tool or machinery in which it is incorporated may be utilized by the operator for performing a desired service. Frequently, when a power tool or piece of machinery includes a motor similar to the electrical motor of this invention and is used for performing a heavy service, for example, such as for providing operational power to a power tool like a masonry saw for use in cutting bricks, or other stone members, oftentimes the overloads placed upon the tool in cutting such hardened objects will effect a counterforce that restrains and acts against the normal motor torque. Such a restraining force may decrease the speed of the motor and enhance its internal temperature, particularly the temperature of its run windings, due to the hindrance placed upon the natural flow of electric charge within its circuitry and normal exertion of electromotive force in creating motor torque. If the motor is overloaded in work to such an extent that its speed of revolution is decreased until the contacts of the centrifugal switch 8 are re-engaged into contact, electrical charge will once again be conducted through the signaling circuit 11 and therein energize the indicator 13 and, as in this case, cause a lighting of the incandescent lamp. Additionally, should the restraints upon the motor torque build up due to an overloading to such a magnitude that the temperature of the run windings 4 reaches a preset elevated degree, the heat developed by said windings will cause the thermally responsive switch 15 to engage in circuit conducting contact, and thereby close the signaling circuit 11 for allowing the communication of electrical charge therethrough, and provide a lighting of lamp 13. It should be noted that the lighting of said lamp may be independently produced by either the closing of the contacts of the centrifugal switch 8 or by the closing of the thermal switch 15. It should further be recognized that the actuation of either of the aforementioned switches will cause a lighting of the lamp, but will in no way affect the continued electrical functioning of the primary winding circuit, or disrupt the further running operation of the motor. Thus, while the operator is making use of a power tool containing a motor incorporating the signaling circuit of this invention, and is warned by the energizing of the indicator 13 that either the motor circuitry is overheating or that too great a strain from overloading is being exerted upon the motor torque, he may, at his discretion, either continue to make use of the tool until he completes his work, decrease the workload, or he may shut off the motor by opening switch 2. Sometimes, the operator may be nearing completion of his work and may desire to finish it even though the signaling circuit of the motor has been excited and provides warning of excessive use. Prior control circuits under such circumstances would have automatically curtailed the further performance of the motor and would have subjected the operator to the annoyance of having to wait until the motor temperature had lowered to a safe level or until the motor torque had once again built up to a sufficient workable level. By employing this invention, the operator will be alerted to the overuse of the motor, but will also be free to continue his work.

The motor circuitry as revealed in FIGURE 2 provides a more detailed disclosure of the signaling circuit of this invention as contained within a capacitor start, capacitor run motor. Common single phase alternating current is supplied to the motor by means of circuit lines $L_3$ and $L_4$, and a double pole switch 20 provides a control means for starting or ending the energization of said motor. When said switch is closed into line contact, the electrical charge will traverse through the conductors 22 and 23 and induce an electromagnetic force within the run windings 21 of the primary windings circuit. Additionally, electrical charge will be conveyed through the conductors 24 and 25 for energizing the run windings 26 providing an additional magnetic field for bolstering the running power of the electrical motor. During the initial power build up of the motor torque as when the electrical motor has first been turned to the "on" position, current will simultaneously be conducted in a slightly out-of-phase pattern through the auxiliary windings circuit by the functioning of the starting capacitor 29 and therein act upon the windings 28 to assist in the power build up of the motor. After the motor speed attains an operable efficiency, the centrifugal switch 30 will break contact and thereby eliminate a further functioning of the windings 27 within the motor circuitry. But, if the optionally provided run capacitor 32 is maintained within the motor circuit, the breaking of contact of the centrifugal switch 30 will have no substantial effect upon performance of the windings 28, and said windings will continue to provide a supplemental electromotive force due to the sustained performance of said run capacitor. Since the run capacitor is interconnected in direct line contact to the windings 28 and the circuit line $L_3$, the electric current will by-pass the centrifugal switch and fail to be affected by its opening or closing in contact as effected by the variations in speed of the motor.

As the electrical motor builds up an operational efficiency so as to disengage the centrifugal switch 30 from contact, the indicator 33 will cease to be energized and the motor will continue to perform at a sustained rate. But, should the motor be overloaded in its performance such as to cause a raising of the temperature within its run windings, an elevation of the temperature to a finite degree will produce a closing in contact of the thermally responsive switch 37, and thereby light the incandescent lamp 33 and reveal a warning to its operator of a misuse of the electrical motor. Additionally, should a restraining force act upon and lessen the speed of the motor, such as an overloading of the motor that acts contrary to the normal motor torque, the centrifugal switch 30 will re-engage into circuit contact and excite the incandescent lamp to light as a forewarning to the user of the excessive overload upon the electrical motor. In either case, when the lamp is lighted due to an abnormal use of the motor, the motor will still function for continued usage, but also will provide an essential warning to its user that an excessive load is being imposed upon it. The user, then, may either continue at his own risk to perform his work with the motor, or he may turn it off by opening the line switch 20 until the motor's condition has once again returned to within the margin of safety.

It is to be understood that the above described details and arrangements of the various parts of the invention are merely illustrative of the application of the principles of the invention. Numerous other arrangements may be readily devised by those skilled in the art which will embody the principles of the invention and fall within the spirit and scope thereof.

Having thus described the invention, what is claimed and desired to be secured by Letters Patent is:

1. An electrical motor signaling circuit for use in conjunction with an electrical motor having primary and auxiliary windings circuits, a signaling circuit connected in parallel relationship to said primary and auxiliary windings circuits, an indicator contained within said signaling circuit, a normally open thermally responsive switch series connected with said indicator within said signaling circuit and disposed in heat transfer relationship with said primary windings circuit, a centrifugal switch contained in said auxiliary windings circuit and responsive to variations in motor speed, said signaling circuit being electrically connected to said centrifgual switch in shunt relationship to said thermally responsive switch, said indicator and signaling circuit being energized when one of said thermally responsive switch and said centrifugal switch is closed.

2. An electrical motor signaling circuit for use in conjunction with a single phase, alternating current motor having primary and auxiliary windings circuits, a signaling circuit electrically connected in parallel relationship to said primary and auxiliary windings circuits, an indicator series connected within said signaling circuit, a normally open thermally responsive switch series connected within said signaling circuit and being actuated into electrical contact upon exposure to elevated temperatures produced under overload conditions in said primary windings circuit, a double contact centrifugal switch series connected within said auxiliary windings circuit and being responsive to variations in the running speed of said motor, the signaling circuit being electrically connected intermediate the double contacts of said centrifugal switch, said signaling circuit and indicator being energized upon the closing of one of said thermally responsive switch and centrifugal switch without de-energizing said primary winding.

3. The combination with an electrical motor having a starting means and a running winding having opposite terminals, of an electrically energizable signal device having two leads, one of said leads being permanently electrically connected to one terminal of said running winding, the other of said leads being selectively connectible with the other terminal of said running winding, thermo-responsive means in heat transfer relationship with said running winding and electrically connected in series with said second-mentioned lead to selectively connect it with said other terminal of said running winding when said thermo-sensitive part has reached a predetermined temperature; an auxiliary circuit paralleling said second-mentioned lead, and including a centrifugal switch which, when closed, completes a circuit from said other terminal of said running winding through said starting means and through said auxiliary circuit to said signal device.

References Cited

UNITED STATES PATENTS

| | | |
|---|---|---|
| 2,165,082 | 7/1939 | Weber. |
| 2,623,979 | 12/1952 | Shewmon. |
| 2,930,959 | 3/1960 | Slocum. |
| 3,036,255 | 5/1962 | Lewus _____ 318—221 |
| 3,087,102 | 4/1963 | Brown _____ 318—221 X |
| 3,138,741 | 6/1964 | Scott _____ 318—221 X |
| 2,645,766 | 7/1953 | McDowell _____ 340—264 |
| 2,736,884 | 2/1956 | Yeomans _____ 340—228 |
| 2,941,192 | 6/1960 | Postal _____ 340—228 |
| 3,146,433 | 8/1964 | Hurlburt _____ 340—271 |
| 3,307,167 | 2/1967 | Race _____ 340—253 |

ORIS L. RADER, Primary Examiner

ALFRED G. COLLINS, Assistant Examiner

U.S. Cl. X.R.

318—221; 340—264